United States Patent [19]
Wang et al.

[11] Patent Number: 5,906,742
[45] Date of Patent: May 25, 1999

[54] MICROFILTRATION MEMBRANES HAVING HIGH PORE DENSITY AND MIXED ISOTROPIC AND ANISOTROPIC STRUCTURE

[75] Inventors: I-Fan Wang, San Diego; Jerome F. Ditter, Santa Ana; Rick Morris, Encinitas, all of Calif.

[73] Assignee: USF Filtration and Separations Group Inc., Timonium, Md.

[21] Appl. No.: 08/950,332

[22] Filed: Oct. 14, 1997

Related U.S. Application Data

[63] Continuation of application No. 08/498,722, Jul. 5, 1995, abandoned.

[51] Int. Cl.[6] .................................................. B01D 39/00
[52] U.S. Cl. .............. 210/500.41; 210/490; 210/500.22; 210/500.27; 210/321.6; 264/41; 264/49
[58] Field of Search .............................. 210/500.41, 490, 210/500.22, 500.27, 321.6; 264/41, 49

[56] References Cited

U.S. PATENT DOCUMENTS 4,840,733   6/1989   Sasaki et al. ....................... 210/500.41
5,846,422  12/1998   Ditter et al. ....................... 210/500.41

*Primary Examiner*—Ana Fortuna
*Attorney, Agent, or Firm*—Knobbe, Martens, Olson & Bear, LLP

[57] ABSTRACT

The present invention relates to the field synthetic polymeric microfiltration membrane materials that are fabricated to separate liquids from solids contained therein. One aspect of the invention relates to a sulfone polymer membrane with high surface porosity (high pore density) and distinctive asymmetry that can separate solids (i.e., blood cells) from a liquid (i.e., plasma) without the need for centrifugation. The membrane is further rendered hydrophilic through co-casting the sulfone polymer (which is a hydrophobic polymer) with a hydrophilic polymer, such as polyvinylpyrrolidone. Because of these properties and the fact that it requires only a small amount of the solid containing liquid (i.e., whole blood) to be applied to the larger pore surface, the membranes of the invention are highly useful in testing devices for the quick detection of properties or components contained in liquid samples, such as diagnostic applications (i.e., the detection of physiological conditions (i.e., pregnancy, insulin levels, stomach ulcer, and the like) and infectious diseases (i.e., AIDS, hepatitis, and the like)).

31 Claims, 13 Drawing Sheets

SEM PHOTO 2 OF POLYSULFONE MEMBRANE
QUENCH BATH TEMP.:46°C
CROSS-SECTION @ MAGNIFICATION=350 X

CROSS-SECTION @ MAGNIFICATION=350X

SEM PHOTO 4 OF POLYSULFONE MEMBRANE
QUENCH BATH TEMP.: 65°C
CROSS-SECTION @ MAGNIFICATION=350 X

SEM PHOTO 5 OF POLYSULFONE MEMBRANE SURFACE(TIGHT SIDE) @ MAGNIFICATION=1,000 X

CROSS-SECTION @ MAGNIFICATION=200 X

SEM PHOTO 7 OF POLYSULFONE MEMBRANE
SURFACE(TIGHT SIDE) @ MAGNIFICATION=1,000 X

CROSS-SECTION @ MAGNIFICATION=200 X

BTS-45

MICROFILTRATION MEMBRANES HAVING HIGH PORE DENSITY AND MIXED ISOTROPIC AND ANISOTROPIC STRUCTURE

This application is a continuation of U.S. patent application Ser. No. 08/498,722, filed Jul. 5, 1995, now abandoned.

BACKGROUND OF THE INVENTION

1. Field of the Invention

The present invention relates to the field synthetic polymeric microfiltration membrane materials. Membranes in accordance with the invention and integral membranes that possess a mixed isotropic and anisotropic structure and have a high pore density in the microporous surface of the membranes.

2. Background of the Technology

Asymmetric or anisotropic membranes are well known in the art. For example, Wrasidlo in U.S. Pat. Nos. 4,629,563 and 4,774,039 and Zepf in U.S. Pat. Nos. 5,188,734 and 5,171,445, the disclosures of which are hereby incorporated by reference, each disclose asymmetric or anisotropic membranes and methods for their production. Each of the Wrasidlo and Zepf patents disclose integral, highly asymmetric, microporously skinned membranes, having high flow rates and excellent retention properties. The membranes are generally prepared through a modified "phase inversion" process using a metastable two-phase liquid dispersion of polymer in solvent/nonsolvent systems which is cast and subsequently contacted with a nonsolvent. The Zepf patent discloses an improvement over the Wrasidlo patent.

Phase inversion processes generally proceed through the following steps of: (i) casting a solution or a mixture comprising a suitably high molecular weight polymer(s), a solvent(s), and a nonsolvent(s) into a thin film, tube, or hollow fiber, and (ii) precipitating the polymer through one or more of the following (mechanisms:

(a) evaporation of the solvent and nonsolvent (dry process);

(b) exposure to a nonsolvent vapor, such as water vapor, which absorbs on the exposed surface (mixed wet and dry process);

(c) quenching in a nonsolvent liquid, generally water (wet process); or (d) thermally quenching a hot film so that the solubility of the polymer is suddenly greatly reduced (thermal process).

Schematically, the inversion in phase from a solution to a gel proceeds as follows:

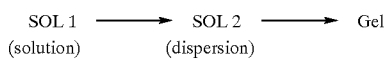

Essentially, SOL 1 is a homogenous solution, SOL 2 is a dispersion, and the Gel is the formed polymer matrix. The event or events that triggers SOL 2 formation depends on the phase inversion process used. Generally, however, the triggering event or events revolve around polymer solubility in the SOL. In the wet process, SOL 1 is cast and contacted with a nonsolvent for the polymer which triggers the formation of SOL 2 which then "precipitates" to a Gel. In the mixed wet and dry process, SOL 1 is cast and exposed to a gaseous atmosphere including a nonsolvent for the polymer which triggers the formation of SOL 2 which then "precipitates" to a Gel. In the thermal process, SOL 1 is cast and the temperature of the cast film is reduced to produce SOL 2 which then "precipitates" to a Gel. In the dry process, SOL 1 is cast and contacted with a gaseous atmosphere (such as air) which allows evaporation of one or more of the solvents which triggers the formation of SOL 2 which then "precipitates" to a Gel.

The nonsolvent in the casting dope is not necessarily completely inert toward the polymer, and in fact it usually is not and is often referred to as swelling agent. In the Wrasidlo-type formulations, as discussed later, selection of both the type and the concentration of the nonsolvent is important in that it is the primary factor in determining whether or not the dope will exist in a phase separated condition.

In general, the nonsolvent is the primary pore forming agent, and its concentration in the dope greatly influences the pore size and pore size distribution in the final membrane. The polymer concentration also influences pore size, but not as significantly as does the nonsolvent. It does, however, affect the strength and porosity (void volume). In addition to the major components in the casting solution (dope), there can be minor ingredients, for example, surfactants or release agents.

Polysulfone is especially amenable to formation of highly asymmetric membranes, particularly in the two-phase Wrasidlo formulations. These are not homogeneous solutions but consist of two separate phases one a solvent-rich clear solution of lower molecular weight polymer at low concentrations (e.g., 7%) and the other a polymer-rich turbid (colloidal) solution of higher molecular weight polymer at high concentrations (e.g., 17%). The two phases contain the same three ingredients, that is, polymer, solvent, and nonsolvent but in radically different concentrations and molecular weight distributions. Most importantly, the two phases are insoluble in one another and, if allowed to stand, will separate. The mix must be maintained as a dispersion, with constant agitation up until the time that it is cast as a film. Essentially, in Wrasidlo type formulations, the casting dope is provided in a SOL 2 (dispersion) condition. Thus, the dispersion serves as the starting point for gel formation and not as the intermediate step (above), as follows:

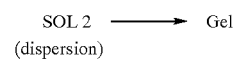

This process modification was largely responsible for the higher degrees of anisotropy and uniform consistency of the Wrasidlo Membranes as compared to the prior art.

It is the nonsolvent and its concentration in the casting mix that produces phase separation, and not every nonsolvent will do this. The ones that do, probably have a role similar to that of a surfactant, perhaps creating a critical micelle concentration by aligning some of the larger polymer molecules into aggregates, or colloids, which are then dispersed in the remaining non-colloidal solution. The two phases will separate from one another if allowed to stand, but each individual phase by itself is quite stable. If the temperature of the mix is changed, phase transfer occurs. Heating generates more of the clear phase; cooling does the reverse. Concentration changes have the same effect, but there is a critical concentration range, or window, in which the phase separated system can exist, as discussed by Wrasidlo. Wrasidlo defines this region of instability on a phase diagram of thus dispersed polymer/solvent/nonsolvent at constant temperature, lying between spinodal and binodal curves, wherein the polymer is not completely miscible with solvent.

Because of the great hydrophobicity of the polymer and because of the thermodynamically unstable condition of the casting mix, wherein there pre-exist two phases, one solvent-rich and the other polymer-rich (a condition that other systems must pass through when undergoing phase inversion), the unstable Wrasidlo mixes precipitate very rapidly when quenched so as to form a microporous skin at the interface and consequently develop into highly asymmetric membranes, a structure shared by each of the Wrasidlo and Zepf patents.

"Asymmetric" as used in the context of the Wrasidlo patents refers to membranes that possess a progressive change in pore size across the cross-section between the microporous skin (the fine pored side of the membrane that constitutes the air-solution interface or the quench-solution interface during casting) and substructure. This stands in contrast to reverse osmosis and most ultrafiltration membranes which have abrupt discontinuities between a "non-microporous skin" and substructure and are also referred to in the art as asymmetric.

Polymeric membranes can also be cast from homogeneous solutions of polymer. The composition of these formulations lie outside of the spinodal/binodal region of the phase diagram of Wrasidlo. Membranes cast from homogeneous solutions may also be asymmetric, although not usually to the same high degree of asymmetry as those cast from phase separated formulations.

The Wrasidlo membranes have improved flow rates and permselectivity in relation to prior art membranes. Such improved flow rates and permselectivity arise from the structure of the membranes.

The Zepf patents disclose improved Wrasidlo-type polymer membranes having a substantially greater number of microporous skin pores of more consistent size, and greatly increased flow rates, with reduced flow covariance for any given pore diameter. The improved Zepf membranes are achieved by modifications to the Wrasidlo process, comprising reduced casting and quenching temperatures, and reduced environmental exposure between casting and quenching. Zepf further teaches that reduced casting and quenching temperatures minimize the sensitivity of the membrane formation process to small changes in formulation and process parameters.

Increasing the surface pore size of membranes has been described. See UK Patent No. 2,199,786 to Fuji (herein "Fuji"). The Fuji patent, as well as other references, teach that when one exposes a cast polymer solution to humid air, a phase inversion at a point below the surface of the membrane will occur. See Fuji patent. Membranes produced in accordance with the Fuji process have a characteristic structure of relatively wide pores on the surface (i.e., 0.05–1.2 $\mu$m), followed by progressively constricting pore sizes to the phase inversion point below the surface, followed by an opening of the pores until an isotropic structure is achieved progressing to the cast surface (i.e., 1–10 $\mu$m). Accordingly, the Fuji membranes can be thought of as having reverse asymmetry from the skin surface to the point of inversion and asymmetry progressing into an isotropic structure. The patent expressly teaches that minimal asymmetry should be used in order to prolong the life of the membranes. See Page 4, Lines 7–29. Further, it appears as though the Fuji membranes are generally prepared with formulations having relatively high viscosities. For example, the polymer concentrations are usually quite high and in many cases, the membranes are prepared using polymers as non-solvents. See Example 2, page 12; Example 3, page 15.

Asymmetric microfiltration membranes are useful in many applications. For example, such membranes can be used for a variety of filtration applications (i.e., purification and testing applications in the food and beverage industry, pharmaceutical, and in medical laboratories) in a variety of forms (i.e., disks or cartridges to name a few). Such membranes have become increasingly relevant to the testing industry for uses as diverse as trace metals analysis and medical diagnostics. The membranes have a large pore side and a mnicroporous surface. Through applying a solids containing liquid sample to the large pore surface, a liquid, largely free of solids, emerges from the microporous surface. The solids free liquid sample (filtrate) can be tested without interference from the solid. Such testing can be accomplished chemically, electrically, or through use of a variety of analytical equipment.

One illustrative testing application is offered in the diagnostic industry for which asymmetric membranes have proven particularly suited in blood separation applications. See e.g., Koehen et al. U.S. Pat. No. 5,240,862. Whole blood may be applied to the open pored surface, the cells can be filtered out and retained in the porous support of the membrane, while the plasma in the blood passes through the membrane. Through placing the microporous surface in contact with an analyte detection device, the presence or absence of a particular analyte can be measured, without the interference of the cells. Further, this structure allows one to conduct diagnostic assays without centrifugation.

As was mentioned above, asymmetric membranes can be readily prepared from certain hydrophobic polymers, such as sulfone polymers and mixed cellulose esters. The class of sulfone polymers generally include three classes of polymers: polysulfones, polyethersulfones, and polyarylsulfones. Where membranes are prepared using hydrophobic polymers, however, the resulting membranes are hydrophobic and water will not generally pass through them under reasonable operating conditions. Therefore, in applications requiring operation of the membranes in aqueous environments, the membranes (or the polymers prior to fabrication into membranes) are typically caused to be reacted with, or mixed with, respectively, moieties that cause the resulting membranes to become hydrophilic.

For example, there are several strategies for creating hydrophilic membranes from hydrophobic polymers, these include:

sulfonation of hydrophobic polymers prior to casting as membranes;

contacting cast hydrophobic membranes with agents that impart hydrophilic properties to the cast membranes;

inclusion of hydrophilic moieties in the casting dope prior to casting membranes therefrom.

Each of these methods for imparting hydrophilicity to membranes has inherent problems or difficulties. For example, where a membrane is post-treated with a moiety to impart hydrophilicity there is a potential that the moiety will leach and contaminate the sample. One can attempt to minimize leaching through crosslinking certain moieties to the surface of the cast membrane. For example, Roesink et al. in U.S. Pat. No. 4,798,847 to (now Re. No. 34,296) disclose crosslinking PVP to polysulfone membranes. However, while crosslinking hydrophilic moieties to membranes appears to minimize leaching, it can add additional steps and complexities to the fabrication process of a membrane. Further, depending on the conditions required for the crosslinking, membrane strength and/or rigidity can be compromised.

Where hydrophobic polymers are sulfonated prior to casting, it is very difficult, if not impossible, to prepare an asymmetric membranes therefrom. Thus, one is constrained to manufacture only isotropic membranes.

The final approach to imparting hydrophilicity to membranes involves the inclusion of a hydrophilic moiety within the casting suspension. For example, Kraus et al. in U.S. Pat. Nos. 4,964,990 and 4,900,449 disclose formation of hydrophilic microfiltration membranes from hydrophobic polymers through inclusion in the casting solution of a hydrophilic polymer, such as PEG or PVP. The membranes prepared in accordance with the Kraus patents are, however, isotropic and are therefore not well suited to the testing application that are facilitated by asymmetric membranes.

Accordingly, it would be desirable to provide an asymmetric microporous membrane having a high degree of stable hydrophilicity, sufficient strength and rigidity, and that operates efficiently and effectively in testing applications.

SUMMARY OF THE INVENTION

One aspect of the invention relates to a sulfone polymer membrane with high surface porosity and distinctive asymmetry that can separate solids from a liquid sample without the need for centrifugation. The membrane is further rendered hydrophilic through co-casting the sulfone polymer (which is a hydrophobic polymer) with a hydrophilic polymer, such as polyvinylpyrrolidone. Because of these properties and the fact that it requires only a small amount of a liquid sample applied to the larger pore surface, the membranes of the invention are highly useful in testing devices for the rapid detection of analytes in a liquid sample without the interference of solids. One exemplary use of the membranes of the invention is in blood separation applications for the rapid detection of physiological conditions (i.e., pregnancy, insulin levels, stomach ulcers, and the like) and infectious diseases (i.e., AIDS, hepatitis, and the like).

In accordance with a first aspect of the present invention, there is provided an integral sulfone polymer membrane, rendered hydrophilic through co-casting the sulfone polymer with a hydrophilic polymer, the membrane comprising a microporous skin and a porous support, the microporous skin possessing a high pore density and the porous support comprising an isotropic region of substantially constant pore sizes and an asymmetric region of gradually increasing pore sizes.

In a preferred embodiment, the membrane comprises a mean flow pore size of from about 1 µm to about 5 µm. In another preferred embodiment, the sulfone polymer is selected from the group consisting of polysulfone, polyethersulfone, and polyarylsulfone. In another preferred embodiment, the hydrophilic polyrmer comprises polyvinylpyrrolidone. In another preferred embodiment, the membrane possesses a lateral wicking speed of water of at least 2 mm/second. In another preferred embodiment, the membrane has a thickness and isotropic region extends from the microporous skin through about 15–25% of the thickness.

In accordance with a second aspect of the present invention, there is provided an integral sulfone polymer membrane, rendered hydrophilic through co-casting the sulfone polymer with a hydrophilic polymer, the membrane comprising a microporous skin and a porous support, the microporous skin possessing a high pore density and the porous support comprising an isotropic region defining flow channels of substantially constant diameter and an asymmetric region defining flow channels of gradually increasing diameters.

In a preferred embodiment, the membrane comprises a mean flow pore size of from about 1 µm to about 5 µm. In another preferred embodiment, the sulfone polymer is selected from the group consisting of polysulfone, polyethersulfone, and polyarylsulfone. In another preferred embodiment, the hydrophilic polymer comprises polyvinylpyrrolidone. In another preferred embodiment, the membrane possesses a lateral wicking speed of water of at least 2 mm/second. In another preferred embodiment, the membrane has a thickness and isotropic region extends from the microporous skin through about 15–25% of the thickness.

In accordance with a third aspect of the present invention, there is provided a method to prepare a hydrophilic integral sulfone polymer membrane, the membrane comprising a microporous skin and a porous support, the microporous skin possessing a high pore density and the porous support comprising an isotropic region of substantially constant pore sizes and an asymmetric region of gradually increasing pore sizes, comprising: providing a casting dope comprising between about 8% and 17% by weight of a sulfone polymer and between about 5% and 25% by weight of a hydrophilic polymer, dissolved in a solvent, casting the dope to form a thin film, exposing the thin film to a gaseous environment, including water vapor at a relative humidity of between about 50% and 80% for between about 5 seconds and 35 seconds, and coagulating the film in a water bath having a temperature between about 20° C. and 70° C. and recovering the membrane.

In a preferred embodiment, the dope is a homogeneous solution. In another preferred embodiment, the dope additionally comprises a nonsolvent for the sulfone polymer. In another preferred embodiment, the dope is a dispersion. In another preferred embodiment, the membrane comprises a mean flow pore size of from about 1 µm to about 5 µm. In another preferred embodiment, the sulfone polymer is selected from the group consisting of polysulfone, polyethersulfone, and polyarylsulfone. In another preferred embodiment, the hydrophilic polymer comprises polyvinylpyrrolidone. In another preferred embodiment, the membrane possesses a lateral wicking speed of water of at least 2 mm/second. In another preferred embodiment, the membrane has a thickness and isotropic region extends from the microporous skin through about 15–25% of the thickness.

In accordance with a fourth aspect of the present invention, there is provided an lateral wicking device of the type comprising a separation membrane and a contact membrane, the improvement comprising: the separation membrane comprising an integral sulfone polymer membrane, rendered hydrophilic through co-casting the sulfone polymer with a hydrophilic polymer, the membrane comprising a microporous skin and a porous support, the microporous skin possessing a high pore density and the porous support comprising an isotropic region of substantially constant pore sizes and an asymmetric region of gradually increasing pore sizes.

In a preferred embodiment, the membrane comprises a mean flow pore size of from about 1 µm to about 5 µm. In another preferred embodiment, the sulfone polymer is selected from the group consisting of polysulfone, polyethersulfone, and polyarylsulfone. In another preferred embodiment, the hydrophilic polymer comprises polyvinylpyrrolidone. In another preferred embodiment, the membrane possesses a lateral wicking speed of water of at least 2 mm/second. In another preferred embodiment, the membrane has a thickness and isotropic region extends from the microporous skin through about 15–25% of the thickness. In another preferred embodiment, the device is a lateral wicking device.

BRIEF DESCRIPTION OF THE DRAWING FIGURES

FIG. 1 presents a pair of scanning electron micrographs (SEM's) of a membrane in accordance with the invention. FIG. 1a is a top view of the membrane which shows the microporous surface of the membrane. FIG. 1b is a cross-sectional view of the membrane.

Figure 5A:
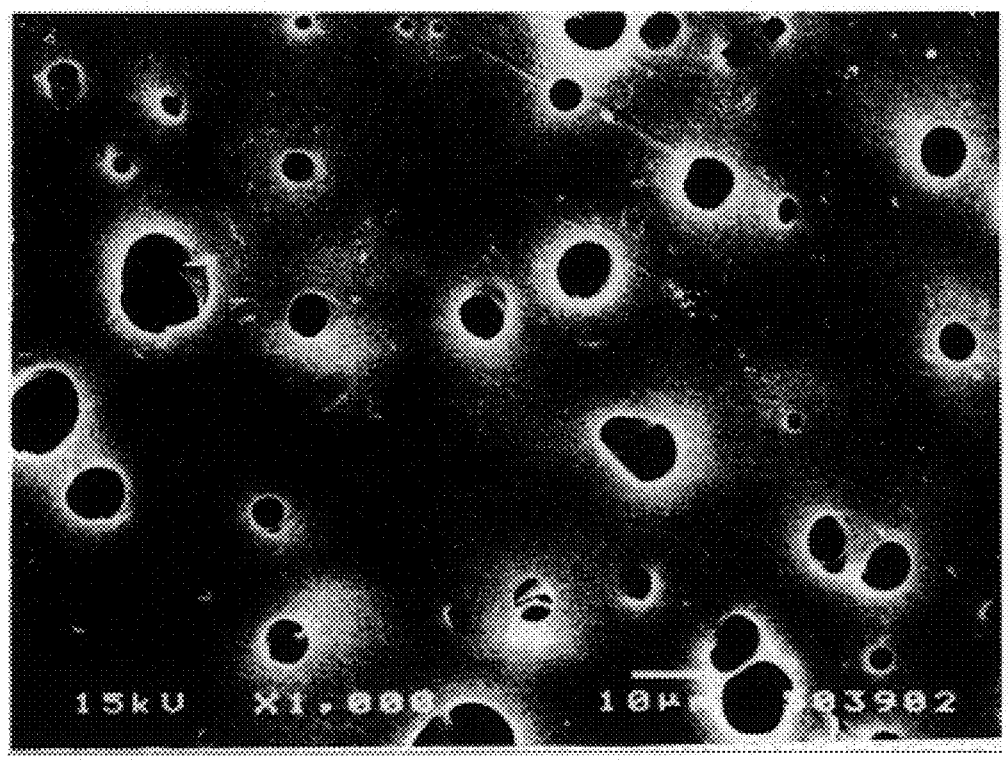
Figure 5B:

FIG. 5 presents a pair of scanning electron micrographs (SEM's) of a membrane in accordance with the invention. FIG. 5a is a top view of the membrane which shows the microporous surface of the membrane. FIG. 5b is a cross-sectional view of the membrane.

Figure 6A:
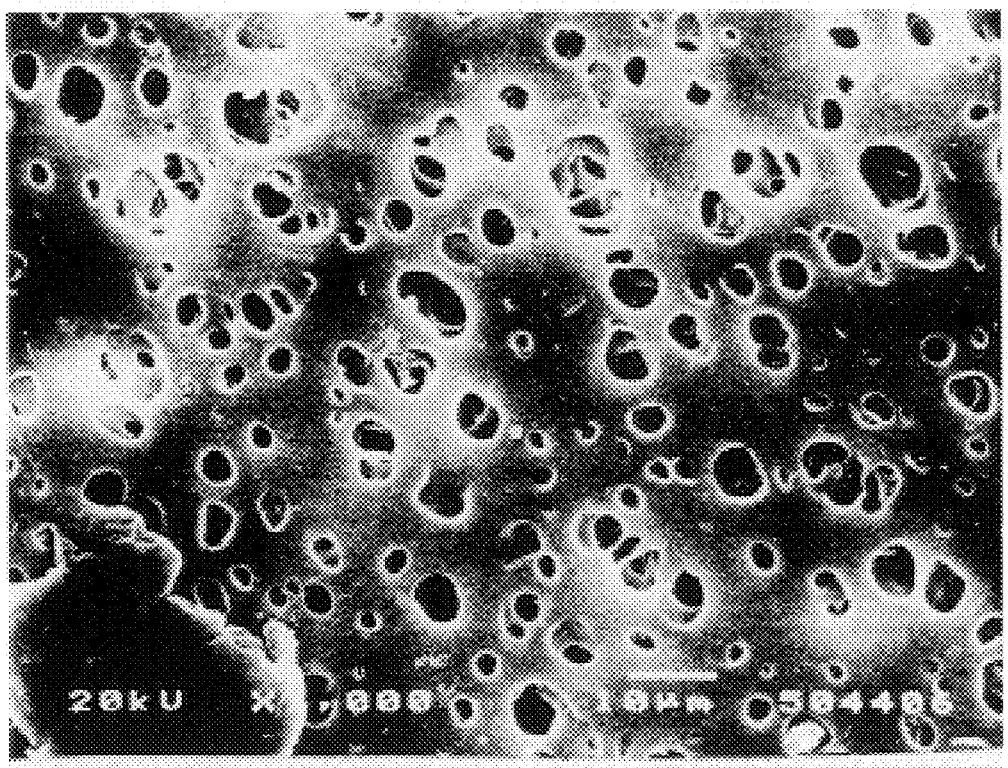
Figure 6B:

FIG. 6 presents a pair of scanning electron micrographs (SEM's) of a membrane in accordance with the invention. FIG. 6a is a top view of the membrane which shows the microporous surface of the membrane. FIG. 6b is a cross-sectional view of the membrane.

Figure 7A:
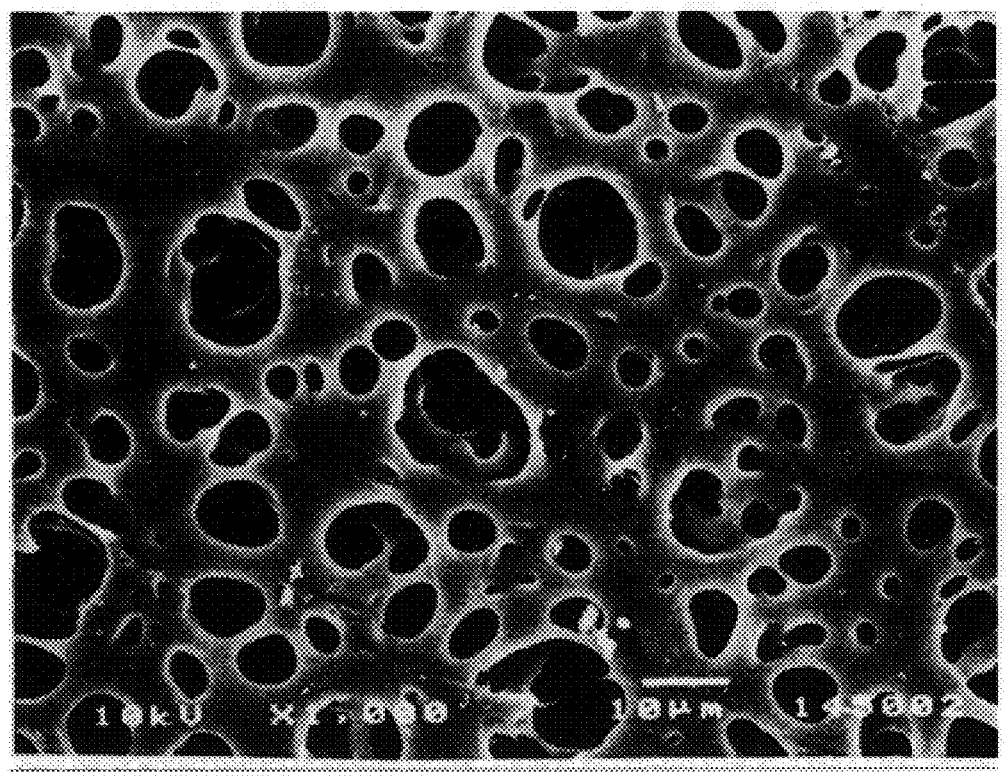
Figure 7B:
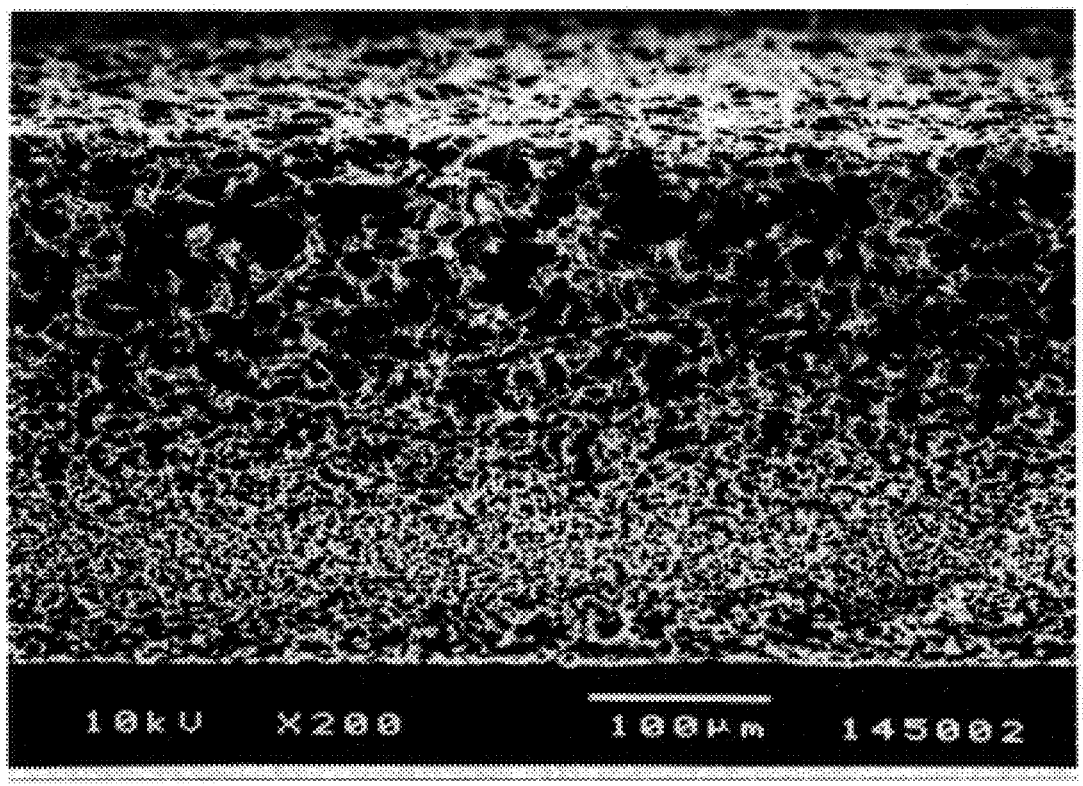

FIG. 7 presents a pair of scanning electron micrographs (SEM's) of a membrane in accordance with the invention. FIG. 7a is a top view of the membrane which shows the microporous surface of the membrane. FIG. 7b is a cross-sectional view of the membrane.

Figure 8:

FIG. 8 is a scanning electron micrograph of a membrane prepared in accordance with the Wrasidlo patent, seen in cross-section, in order to compare the structure of membranes in accordance with the invention.

Figure 9:
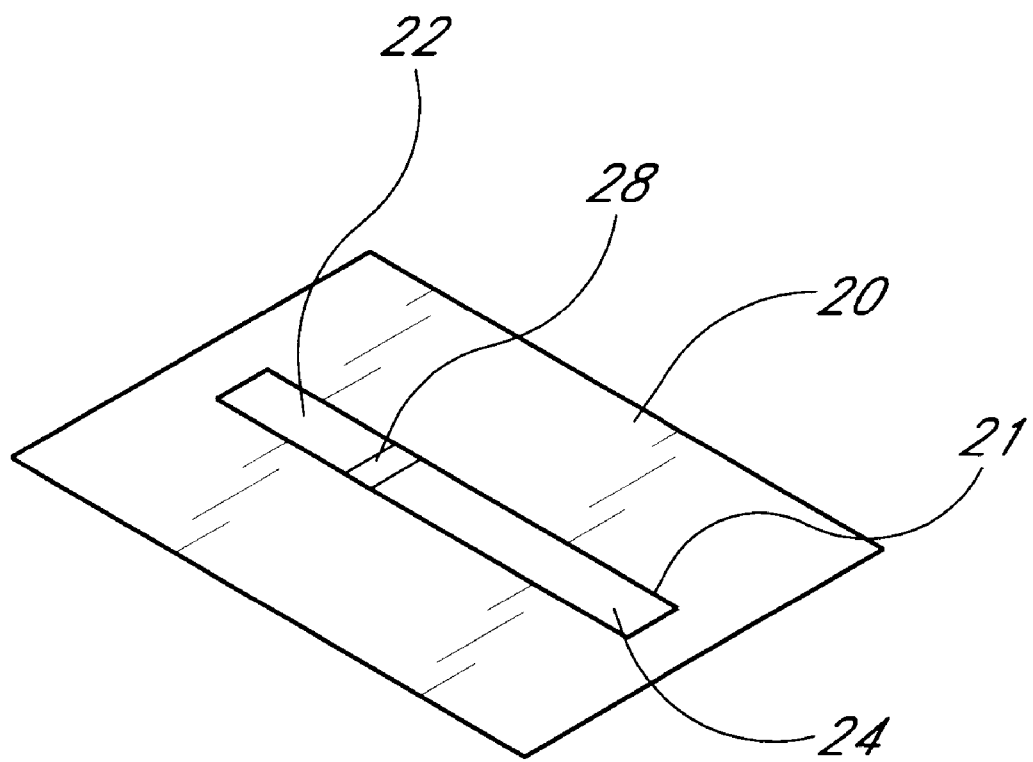

FIG. 9 is a schematic top perspective view of a lateral wicking device in accordance with the present invention.

DETAILED DESCRIPTION OF THE PREFERRED EMBODIMENTS

In accordance with the present invention, we have unexpectedly discovered that it is possible to manufacture an asymmetric, highly hydrophilic, microfiltration membrane that is particularly adapted to lateral wicking separation applications from a hydrophobic polymer that is co-cast as a solution or dispersion with a hydrophilic agent or moiety. In preferred embodiments, the membranes of the invention are manufactured from a sulfone polymer and polyvinylpyrrolidone. Further, in preferred embodiments, the structure of the membranes is not strictly a conventional asymmetric structure. Rather, the membranes possess a combination or composite of isotropic and anisotropic structure. In this way, structurally speaking, the membranes of the invention are similar to the membrane structures disclosed in U.S. patent application, Ser. No. 08/206,114, filed Mar. 4, 1994, the disclosure of which is hereby incorporated by reference.

Architecture of the Membranes of the Invention

The polymer membranes of the invention retain a substantial degree of asymmetry while having relatively large microporous skin pores. A convenient method for assessing the asymmetry and pore size of membranes is through use of scanning electron microscopy (SEM). FIGS. 1 through 7 show the cross sections and/or microporous skin surface of membranes prepared according to the invention. The features of those aspects can be compared to those of a conventional Wrasidlo-type fine pore membrane shown in FIG. 8.

In addition to the asymmetry of the membranes and the open pore structures, the membranes of the invention are unique in the presence of an isotropic region that extends from the microporous skin surface to a point within the substructure of the membrane. Typically, this isotropic region extends through at least about 20% of the membrane thickness.

In the absence of SEM data, asymmetry can be grossly estimated as described by Kesting, *Synthetic Polymer Membranes: A Structural Perspective*, p. 275 (John Wiley & Sons, 2d edition (1985)), by applying a small dot of ink or dye to the tight face of a membrane and allowing the dye to penetrate the membrane as well as spread on its surface. The ratio of the areas coated with dye gives a rough indication of asymmetry, or the degree thereof. Pore size can also be estimated by porometry analysis and by separate measurement of the bubble point, with a higher bubble point indicating tighter pores. In a classical asymmetric membrane, it is the surface pores that are the tightest. In the membranes of the present invention, the tightest pores may lie somewhere between the microporous skin and the asymmetric region. Porometry consists of utilizing gradually increasing pressures on a wet membrane and comparing gas flow rates with those of the dry membrane which yields data on pore sizes as well as the bubble point. For these analyses, a Coulter Porometer Model 0204 was used.

As mentioned, the membranes of the present invention include a region that is generally isotropic and a region that is substantially asymmetric. Generally isotropic (or the isotropic region), as used herein, means a region of generally constant pore size, as viewed by SEM from the microporous skin down through a portion of the supporting structure. The isotropic region may, alternatively, be viewed as a region having flow channels of a substantially constant mean diameter. In general, the average microporous skin pore size or diameter of the microporous skin pores of the membranes of the invention are greater than 1.0 $\mu$m. In the isotropic region, this microporous skin pore size generally defines the mean pore size throughout the isotropic region. For example, in preferred membranes, SEM's suggest that a membrane having a mean microporous skin pore size of 2 $\mu$m has a average pore size of 2 $\mu$m or greater throughout the isotropic region. Similar structures are seen in membranes having 3 $\mu$m, 4 $\mu$m, 5 $\mu$m, and etc. microporous skin pore sizes. However, it will be appreciated that the isotropic region comprises a distribution of pore sizes that visually appear isotropic. It is expected that the actual pore sizes in the isotropic region vary somewhat (i.e., possess some degree of pore size distribution) as is the case with any membrane.

Typically, the isotropic region extends from the microporous skin of the membranes into the supporting substructure through greater than about 10% of the thickness of the membrane. More preferably, the isotropic region extends through greater than 30%, 40%, or even 50% or more of the thickness of the membrane. In highly preferred embodiments, the isotropic region extends greater than about 20% the thickness of the membrane. For example, in a 250 $\mu$m membrane the isotropic region extends greater than about 50 μm from the microporous skin into the supporting substructure.

Substantially asymmetric or anisotropic (herein, the asymmetric region), as used herein, means a degree of asymmetry similar to that disclosed in, and possessed by, membranes prepared in accordance with Wrasidlo and Zepf patents. In that regard, the membranes of the present invention have average microporous skin pore sizes of greater than about 1.0 μm, while on the reverse side, the side adjacent to the support paper or belt during casting, SEM's show that the average pore sizes are at least greater than twice the average microporous skin pore size. Thus, the ratio of microporous skin pore size to cast surface pore size is greater than about 2:1, and in highly preferred embodiments is 3:1, 4:1, 5:1, or even 6:1 or greater. Moreover, the asymmetry is a continuous gradient only within the asymmetric region.

It should be noted that the ratio of asymmetry mentioned above is only with respect to the asymmetry measured at the surfaces. In fact the asymmetry of the membranes of the invention is much greater when the mean pore size in the asymmetric region, above the cast surface, are viewed on cross-section in scanning electron microscopy. See, for example, FIGS. 5–7. When this is done, the asymmetry of the membranes of the invention appears to be greater than about 10:1 or 20:1 or perhaps as high as 100:1 or even 200:1.

It will also be noticed by looking through the microporous skin pores that the pore sizes in the isotropic region appear slightly larger than the pores in the microporous skin. This fact, in combination with the observed asymmetry based on surface-surface analysis versus cross-sectional analysis indicates that some quanta of "skinning" occurs on both surfaces. Without wishing to be bound by any particular theory or mode of operation, there are three plausible explanations for the skinning seen in the membranes of the invention. First, when the cast film is exposed to air, the water vapor begins to gel the film and form the incipient membrane in the top region. However, not all of the polymer may be gelled in this brief time. Therefore, when the film hits the quench liquid, the remaining unprecipitated polymer then forms a microporous skin. Second, or alternatively, a perhaps better explanation is simply that surface contraction shrinks the pores due to the inherent difference in surface energies (somewhat analogous to a water droplet or a soap bubble that minimizes its surface-to-volume ratio). Or, third, there may be a slight migration of polymer to the surface due to the steep gradient in chemical potential.

Additionally, due to the fact that the bubble point of the membranes of the invention are generally higher than what would be predicted for the pore sizes seen in the isotropic region or in the microporous skin, it is apparent that there must be some constriction in pore size between the isotropic region and the asymmetric region. Surprisingly, conventional reasoning would suggest that the pores below the microporous skin should be smaller than the microporous skin pores. In fact, they should grow progressively smaller with depth, i.e., "reverse asymmetry". Diffusion is a slow process. Thus, the pores created or formed below the microporous skin should be exposed to or "see" less water vapor and, therefore, be smaller.

The Fuji membranes appear to confirm this conventional reasoning and have "reverse asymmetry" from the skin to an inversion point a short depth into the membrane. In contrast, the pores below the microporous skin in the membranes of the invention appear to be of the same size or larger than the pores in the microporous skin and remain with such isotropic or homogeneous pore distribution throughout the region.

Therefore, it appears that the isotropic region of the membranes of the invention is created by or is at least initiated by a "dry process" interaction between the water vapor in the air and the polymer film, which causes homogeneous or isotropic formation. This is analogous to membranes prepared from cellulose mixed esters or cellulose nitrate membranes. However, it appears as though there is relatively limited evaporation of solvent or non-solvent (depending on, among other things, exposure time prior to quenching), so that, when quenched, the quench liquid rushes in and fixes the isotropic region and creates and fixes the asymmetric region.

With respect to the possible constriction of the pore size distribution between the isotropic region and the asymmetric region, discussed above, which would assist in explaining the tighter pores observed in porometry analyses (i.e., 1.0 μm maximum and 0.8 μm mean pore size), there may be a process of internal "skinning" akin to the microporous skin formation in Wrasidlo and Zepf membranes. Support for this possibility is given by Michaels in U.S. Pat. No. 3,615,024, Col. 5, lines 43–54, where it is disclosed that a gradient pore structure occurs when water permeation into a cast film is restricted by a tightened skin, which is formed by the water in the first instance. Or, alternatively, as discussed above, it is possible that while the membranes in the isotropic region appear to be isotropic on visual inspection, actually have a pore distribution that accounts for the porometry data and higher bubble point than one might anticipate in view of the large pore sizes.

Accordingly, the structure of the membranes of the present invention is distinct from classic asymmetry in that the membranes of the invention are substantially nonasymmetric (i.e., are isotropic) from the microporous skin to a point below the surface, defined herein as the isotropic region, discussed above. The asymmetric region of the membranes generally occurs in less than about 50% of the thickness of the membrane. Whereas, in conventional or classic asymmetry, for example, in Wrasidlo and Zepf membranes, the asymmetric region occurs throughout the entire, or substantially the entire, membrane thickness. In the Fuji membranes, in contrast, the region below the skin has inverse or reverse asymmetry, and below that, has slight conventional asymmetry. It is expected that the probable higher viscosities of the Fuji casting formulations contributes to this structure.

Therefore, colloquially speaking, the membranes of the invention can be viewed as having a funnel structure in terms of the flow channel configuration throughout the thickness of the membranes. For example, the pores meeting liquids flowing into the membrane from the surface that was unexposed during casting is very large. This is the asymmetric region, which would correspond to the conical portion of a funnel. As the liquid flows through the membrane, the pore sizes or flow channels gradually constrict, until, finally, the liquid enters the generally isotropic region which contains pore sizes or flow channels of substantially constant diameter, then flows out through the microporous skin, the isotropic region corresponding to the spout of the funnel.

The structure of a typical open pored membrane of the invention prepared from a dispersion is shown in FIGS. 5 through 7. The membranes have microporous skin surface pores of, on average, 2 μm, cast surface pore sizes of, on average, 10 μm, and, in cross-section, demonstrate an isotropic region including pores sizes around 1.0 μm extending from the microporous skin through approximately 20% of the thickness of the membranes, followed by an asymmetric region that opens from pore sizes of approximately 2 μm to about 50 μm from the end of the isotropic region to the cast surface. As will be appreciated, the degree of asymmetry based on these observations is approximately 25:1. The particular membranes of the Figures have water bubble points of between 1 and 5 psid. The membranes shown in FIGS. 5 through 7 have very similar structures but possess mean flow pore sizes of about 4.3 μm (FIG. 5), 2.6 μm (FIG. 6), and 3.8 μm (FIG. 7), respectively, as measured by Coulter porometry.

Preparation of the Membranes of the Invention

Generally membranes in accordance with the invention are prepared through conventional approaches. A polymer casting solution or dispersion is prepared which is then cast, exposed to a gaseous environment for a predetermined period of time, and then quenched in a nonsolvent bath. Preferred casting solutions with or without nonsolvents and casting processes are discussed below.

Casting Solutions With or Without Nonsolvents

Membranes in accordance with the invention can be prepared from homogeneous solutions as well as dispersions. In preferred embodiments, the membranes of the invention are prepared from homogeneous solutions. Homogeneous solutions can be prepared through use of solvents alone, or in combination with nonsolvents. Membranes prepared from dispersions can be formed with bubble points in the same general range as those made from homogeneous solutions. However, such membranes generally require longer periods of exposure to the air before quenching. FIGS. 1–4 show the structure of a membrane produced from a homogeneous solutions, without the use of nonsolvents, as seen through scanning electron microscopy, including microporous skin surface and cross-sections of the membranes.

The membranes of the invention are preferably prepared from a homogeneous solution containing a hydrophobic polymer (i.e., a sulfone polymer), a hydrophilic polymer (i.e., polyvinylpyrrolidone), and a suitable solvent for the hydrophobic polymer and the hydrophilic polymer.

In preferred embodiments, the hydrophobic polymer is a sulfone polymer (i.e., polysulfone, polyarylsulfone, or polyethersulfone), and preferably polysulfone, and most preferably Udel 3500 polysulfone from AMOCO.

Where polysulfone is utilized, the polymer concentration is generally between about 8–17%, or more preferably between about 8–15%, and most preferably between about 10–12%.

The hydrophilic polymer may be any polymer that is compatible with the hydrophobic polymer. In preferred embodiments, the hydrophilic polymer is polyvinylpyrrolidone, preferably having a molecular weight of approximately 40,000. The hydrophilic polymer is included at between about 5–25%, more preferably between about 10–20%, and most preferably between 12–17%.

The solvent is selected so as to be a good solvent for each of the hydrophobic polymer and the hydrophilic polymer. Where the hydrophobic polymer is polysulfone and the hydrophilic polymer is polyvinylpyrrolidone, we have found that N-methyl pyrrolidine, dimethyl formamide, and dimethyl acetamide operate effectively as the solvent. In highly preferred embodiments, dimethyl formamide is utilized as the solvent.

In general, polymer solutions in accordance with the invention are prepared as shown in Table I:

TABLE I

| Constituent | Ratio |
| --- | --- |
| Hydrophobic Polymer | 8–17% |
| Hydrophilic Polymer | 5–25% |
| Solvent | Balance |

In highly preferred embodiments, polymer solutions are prepared as shown in Table II:

TABLE II

| Constituent | Ratio |
| --- | --- |
| Sulfone Polymer | 8–17% |
| Polyvinylpyrrolidone | 5–25% |
| Solvent | Balance |

Partial or complete dispersion formulations can be prepared through the inclusion of a nonsolvent for at least the hydrophobic polymer. For example, water may be added to the formulations in sufficient quantities to create a dispersion casting dope. Or, smaller quantities of nonsolvents may be utilized to form homogeneous solutions. Where a complete dispersion is desired, one can add tertiary amyl alcohol in a sufficient quantity to replace or supplement water as the nonsolvent. Thus, combinations of nonsolvents, or single species of nonsolvents, can be utilized in accordance with the invention to prepare casting dopes with particular quali- Structure of Polyethersulfone

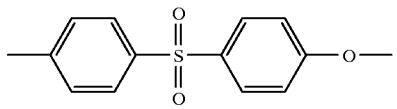

Structure of Polysulfone

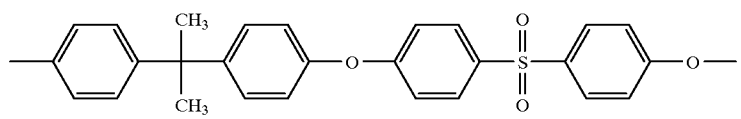

ties. High nonsolvent concentrations can be used to create dispersion formulations, whereas, lower nonsolvent concentrations can be used to form homogeneous solutions. Quantities of nonsolvent can be varied from about 0.1% through about 10%. In preferred embodiments, water is utilized as the nonsolvent in an amount effective to prepare a homogeneous casting dope. For example, where water is utilized as the nonsolvent, the water is preferably included in the casting dope from about 0.1% through about 3.0%, and, in highly preferred embodiments, at about 0.5%.

Casting Solutions to Form Membranes

The polymer solution is typically cast into a thin film, exposed to a gaseous environment for a predetermined period of time, followed by quenching in a nonsolvent for the polymer (particularly, a nonsolvent for the hydrophobic polymer.

The membranes of the invention can be cast using any conventional procedure wherein the casting dispersion or solution is spread in a layer onto a nonporous support from which the membrane can be later separated after quenching. The membranes can be cast either manually (i.e., poured, cast, or spread by hand onto a casting surface and quench liquid applied onto the surface) or automatically (i.e., poured or otherwise cast onto a moving bed). A preferred support is polyethylene coated paper. In casting, particularly in automatic casting, mechanical spreaders can be used. Mechanical spreaders comprise spreading knives, a "doctor blade," or spray/pressurized systems. A preferred spreading device is an extrusion die or slot coater, which comprises a chamber into which the casting formulation can be introduced and forced out under pressure through a narrow slot. In Examples 1 to 3, membranes were cast by means of a doctor blade with a knife gap of typically about 500 through about 800 $\mu$m, or 600 through about 750 $\mu$m, or preferably about 700 $\mu$m.

Following casting, the cast dispersion or solution is quenched. In a preferred embodiment, quenching is accomplished by moving the cast membrane on a moving bed into the quenching liquid, i.e., as a bath. The quenching liquid is most commonly of water, the temperature of which is frequently at or near the casting temperature. In the bath, the quench operation precipitates or coagulates the polymer and can produce a "microporous skin" having the requisite pore sizes and a support region having the characteristic structure. The resulting membrane is ordinarily washed free of entrained solvent and may be dried to expel additional increments of solvent, diluent, and quench liquid, and thus recover the membrane. After the quenching step, the microporous membrane product is typically about 200 to 300 microns thick.

Generally, in preparing the membranes of the invention, the cast film should be exposed to air for a time sufficiently long enough to induce the formation of large surface pores, as discussed previously. The shorter the exposure, the higher the humidity must be, and vice versa. The total humidity is the important factor. At higher ambient air temperatures, the relative humidity can be lower for the same effect. The temperatures of the casting mix and the quench bath are also important parameters. In general, the warmer the mix, the tighter the membrane, while the warmer the quench, the more open will be the membrane.

Generally, in the manufacture of membranes in accordance with the invention, casting solution or dispersion temperatures of between about 20 and 35° C. and quench bath temperatures of between about 20° C. and 70° C., and preferably 30° C. to about 60° C. are utilized. The temperature of the quench bath appears to cause marked changes in the pore sizes of the microporous skin of membranes and also in the asymmetry in the asymmetric region of the resulting membranes. Where higher quench temperatures are utilized, the membranes possess a larger pore size in the microporous skin as well as possess enhanced asymmetry in their asymmetric region. Conversely, where lower temperatures are utilized, smaller pores form and asymmetry is reduced.

Another factor that is important to the manufacture of the membranes of the invention is the exposure time and exposure conditions that exist between the casting of the polymer solution and quenching of the membranes of the invention. Preferably, the cast solution or dispersion is exposed to air after casting but before quenching. More preferably, the air is humid (i.e., greater than about 60% relative humidity). In addition, the air is preferably circulated to enhance contact with the cast solution or dispersion. Circulation can be accomplished with a fan, for example.

The preferred exposure time is generally from about 5 seconds to about 35 seconds. Increasing exposure time, over this range, tends to increase permeability of the resulting membrane. However, where the exposure time is too long, or, the humidity is too high, the surface porosity can be detrimentally effected. In such a situation, it appears as though a relatively nonporous skin results and the membrane ceases to be microporous.

For lateral wicking separation membranes composed of a sulfone polymer and polyvinylpyrrolidone, we find that a temperature between about 45° C. and 55° C. results in a highly favorable pore size and degree of asymmetry. Further, the air exposure is preferably accomplished for between about 10 and 20 seconds where the air preferably has a relative humidity of between about 65 and 80%. However, as will be appreciated, depending on the particular hydrophobic polymer, hydrophilic polymer, solvent, nonsolvent (if any), and relative humidity utilized, the optimum temperatures and conditions can be readily determined without undue experimentation. As will be understood, relative humidity and exposure time are important conditions that are generally inversely proportional. Thus, the higher the relative humidity, the shorter can be the exposure time.

Use of the Membranes of the Invention in Separation Applications

The membranes of the invention are useful for, and exceptionally efficient in, testing and separation applications. In particular, the membranes of the invention are unexpectedly efficient in separation and testing applications. Such devices are also useful in a variety of other testing applications. By way of example, in virtually any situation in which one has a liquid sample that contains a solid particulate in which the liquid is desired to be analyzed, one can utilize a lateral wicking design to obtain an analyzable quantity of the liquid not subject to interference of the solid particulate. One example of the separation and testing applications for which the membranes of the invention are useful in is in diagnostic applications, such as the diagnostic-type devices of the sort disclosed in Koehen et al. U.S. Pat. No. 5,240,862, the disclosure of which is hereby incorporated by reference. The Koehen et al. patent discloses a blood separation system including an asymmetric membrane in intimate contact with a collector membrane. A similar system is disclosed in Kiser et al. U.S. Pat. No. 5,240,862, the disclosure of which is hereby incorporated by reference. In each, whole blood may be applied to the "open" side of an asymmetric membrane (that is, or is rendered, hydrophilic) and the blood cells will be filtered out in the larger pores of the asymmetric membrane, with plasma passing through the microporous surface to contact the collector membrane.

The collector membrane is generally equipped with the analyte detection system. Thus, when a moiety to be tested is present or not present in the plasma, the presence or absence can be registered on the collector membrane. The devices of the Koehen et al. and the Kiser et al. patent are generally referred to as "vertical wicking devices," since the tested material is passing vertically through the membrane. Speed of liquid (i.e., plasma) passage through the membrane is the operative test of efficiency in such devices, as is the completeness of the separation of liquid (i.e., plasma) from solid particulate materials and certain other considerations, such as limited interference of the solid material with the liquid, and, in blood separation applications, the limited lysis of cells.

Another type of testing device design is a "lateral wicking device." In such a device, as shown in FIG. 9, a backing material 20 provides a support for a separation membrane 21 and a contact membrane 22. The contact membrane 22 is equipped with chemical reactants (or other detection facilitators) to allow detection of the presence or absence of the agent to be tested for. The separation membrane 21 is used to separate out components in the liquid, such as solid particulates (i.e., cells from blood). The separation membrane 21 and the contact membrane 22 are in contact at interface 23. Thus, in operation, the liquid containing solid materials (i.e., blood or other bodily fluid components) are contacted with the separation membrane 21 at an application point 24 and the fluid will wick toward the interface 23. Upon wicking, laterally or horizontally, through the separation membrane 21, and reaching the interface 23, the fluid will enter the contact membrane where it will react (or not react, as the case may be) with the chemical reactants (or other detection facilitators) that are provided in the contact membrane 22. Such reaction can be detected by a variety of standard techniques that are well known in the art.

As will be appreciated, the operative test for determining the efficiency of testing devices is the rate of wicking of the appropriate liquid through the membrane as well as the completeness of separation of the liquid from any solids. Thus, in blood separation contexts, speed of plasma passage laterally through the membrane is the operative test of efficiency in such devices, as is the completeness of the separation of plasma and limited lysis of cells.

The membranes of the invention are particularly efficient in use as separation membranes 21 in lateral wicking devices. When a solid containing liquid (i.e., blood) is applied to the more open surface of the membrane and at one end of a narrow strip of this membrane, it begins to wick through to the tighter surface and toward the other end of the strip. The relatively large particles (i.e., blood cells) are restrained (filtered out), while the liquid (i.e., plasma) continues to flow. In a device, the liquid (i.e., plasma) permeates the strip and reaches a second membrane, e.g., nitrocellulose, which contains a testing reagent (i.e., an enzyme, antigen, or antibody linked reagents).

Fast wicking is important. The higher the membrane surface porosity, the faster the plasma transfer rate. Simply providing a high degree of asymmetry does not necessarily translate into an enhanced wicking rate. Low degrees of surface porosity, even with a high degree of asymmetry, appears to cause blocking or clogging of the solid containing liquid, with consequent slower separation than is possible through use of the membranes of the present invention.

The current membranes contain high concentrations of poly(vinylpyrrolidone) (PVP), which makes the membrane hydrophilic and also influences the pore size and structure. Moreover, because the PVP is included in the formulation, there is no need for a second treatment with hydroxypropylcellulose to make the membrane hydrophilic.

The driving force for fast wicking is the hydrophilicity of the PVP in combination with the pore structure, whereby liquid is sucked into the membrane by capillary forces and solids are retained in the more open support. PVP also increases the dope viscosity and slows down the solvent/non-solvent exchange rate and thereby also reduces the degree of asymmetry found in standard membranes. The gelation (quench) bath temperature also plays an important role in that a higher temperature bath creates a more asymmetric and a larger pore size (mean flow pore size) membrane than does a lower temperature bath.

EXAMPLES RELATING TO MEMBRANE MANUFACTURE

The following examples relate to the manufacture of particular microporous membranes in accordance with the present invention. Such examples are meant to be illustrative of the various casting conditions that can be utilized to manufacture membranes in accordance with the invention and to provide guidance as to the manners in which conditions can be modified to achieve particular properties in the resulting membranes. As such, the following examples are illustrative and not limiting.

EXAMPLE 1

Effects of Exposure Time and Humidity

In this example, we prepared and cast membranes prepared from a homogeneous solution of polysulfone and polyvinylpyrrolidone in tertiary amyl alcohol as the solvent. We prepared two separate membranes from the solution, with each membrane prepared with a different exposure time and humidity, as follows:

A homogeneous casting solution was prepared from 12.7% polysulfone polymer (Udel 3500, manufactured by AMOCO Co.), 2.3% t-amyl alcohol, and 16.6% of polyvinylpyrrolidone (PVP, MW 40,000). The casting solution was maintained at room temperature (approximately 20° C.) and two separate membranes were cast. Casting was accomplished using a casting knife that had a gap of 22-mils, onto a moving belt of polyethylene coated paper.

The films were exposed to air, as shown in the following Table:

TABLE III

| Film No. | Air Temperature (° C.) | Relative Humidity | Exposure Time (Sec.) |
|---|---|---|---|
| 1a | 25–30° C. | 100% | 30 |
| 1b | 25–30° C. | 90% | 14 |

The membranes were quenched in a water bath at a temperature of 40° C. After coagulation, the membranes were washed with deionized water and air dried. The characteristics of the resulting membranes are shown in the following Table:

TABLE IV

Figure 1A:
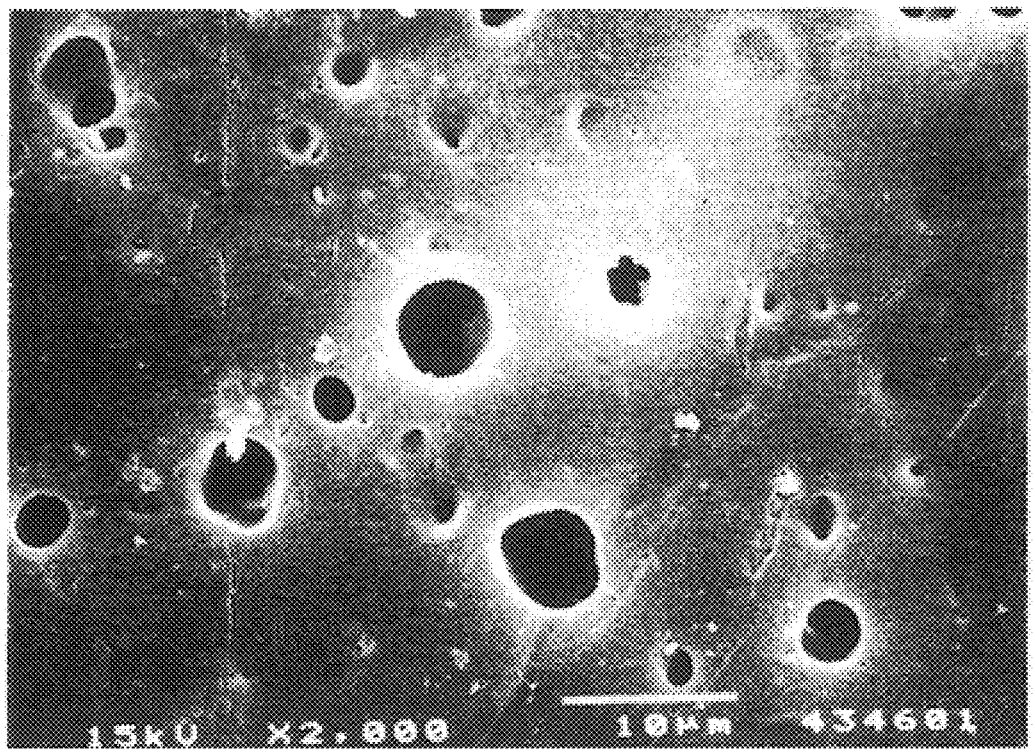
Figure 1B:
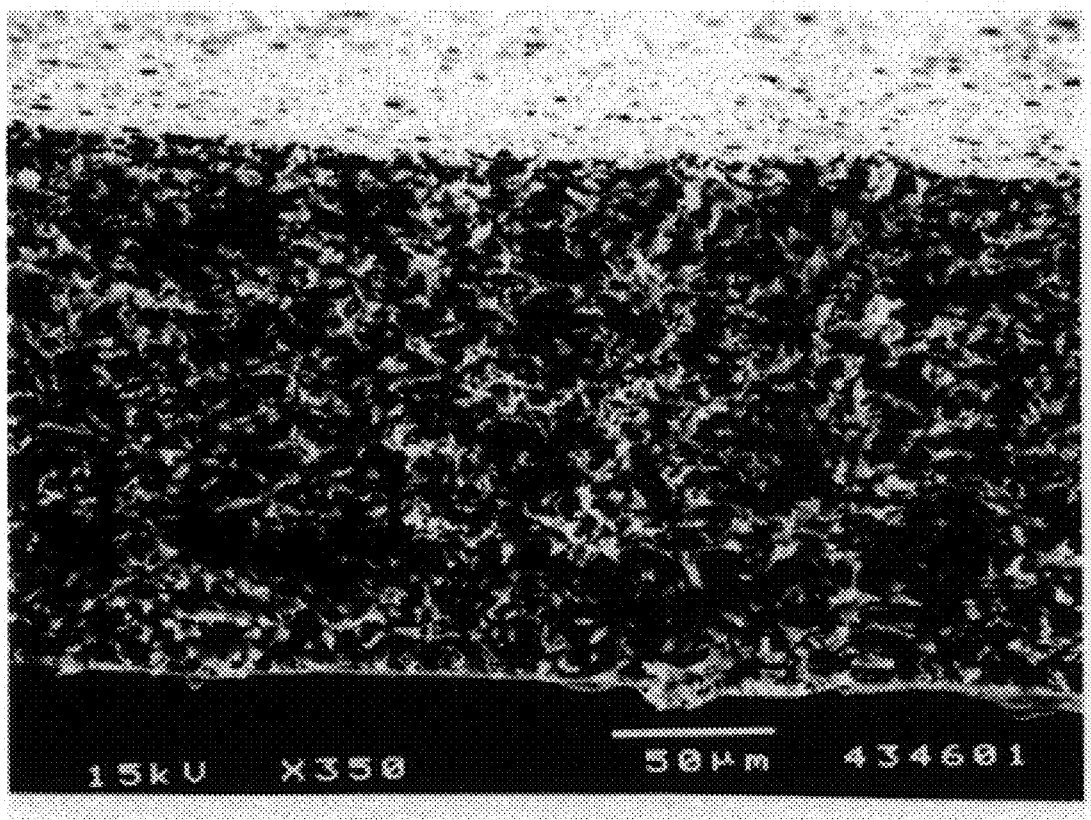

| Film No. | Water Permeabilities[1] | Structure |
|---|---|---|
| 1a | 4138 ml/min | FIGS. 1a and 1b |
| 1b | 150 ml/min | N/A |

[1]Water permeabilities were measured at 10-psid on a 47-mm diameter disc (9.5 cm$^2$).

FIG. 1 presents a pair of scanning electron micrographs (SEM's) of Film No. 1. FIG. 1a is a top view of Film No.

1a, showing the microporous surface of the membrane. FIG. 1b is a cross-sectional view of Film No. 1a. In the Figures, it will be observed that the membrane shows very little asymmetry and low surface porosity.

The water permeability results indicate, however, that permeability increases with increasing exposure time. However, it also appears that prolonged exposure to high humidity, however, eventually decreases the surface porosity and may be detrimental to asymmetry.

EXAMPLE 2

Effects of Quench Temperature

In this example, we prepared and cast membranes prepared from a homogeneous solution of polysulfone and polyvinylpyrrolidone in dimethyl formamide as the solvent. We prepared three separate membranes from the solution, with each membrane prepared with a different quench bath temperature, as follows:

A homogeneous casting solution was prepared from 11% polysulfone polymer (Udel 3500, manufactured by AMOCO Co.), 15% of polyvinylpyrrolidone (PVP, MW 40,000), and 74% dimethyl formamide. The casting solution was maintained at room temperature (approximately 20° C.) and three separate membranes were cast. Casting was accomplished using a casting knife that had a gap of 24-mils, onto a moving belt of polyethylene coated paper.

The films were exposed to air, having a relative humidity of 75%, for 24–25 seconds. After air exposure, the membranes were quenched in water baths as shown in the following Table:

TABLE V

| Film No. | Quench Temperature (° C.) |
| --- | --- |
| 2a | 46° C. |
| 2b | 56° C. |
| 2c | 65° C. |

Following quenching and coagulation of the membranes, the membranes were washed with deionized water and air dried. The characteristics of the resulting membranes are shown in the following Table:

TABLE VI

Figure 2:
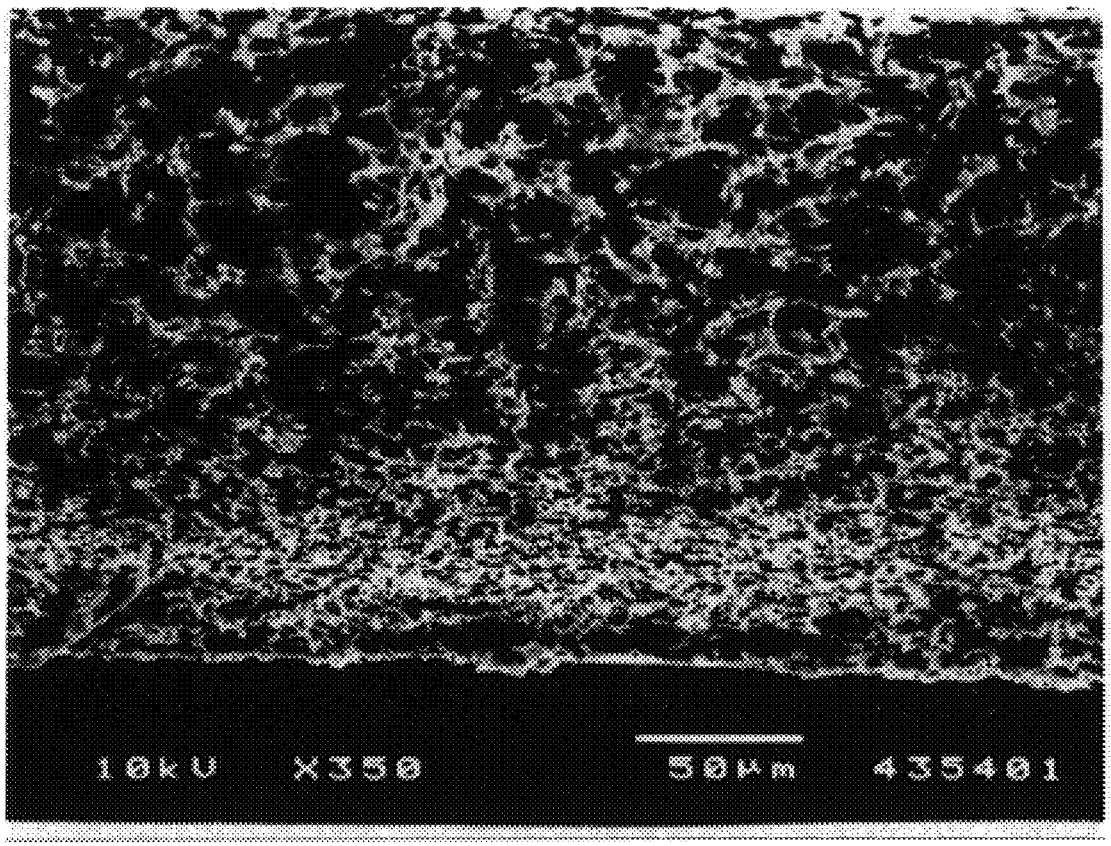
FIG. 2 is a scanning electron micrograph (SEM) of a membrane in accordance with the invention providing a cross-sectional view of the membrane.
Figure 3:
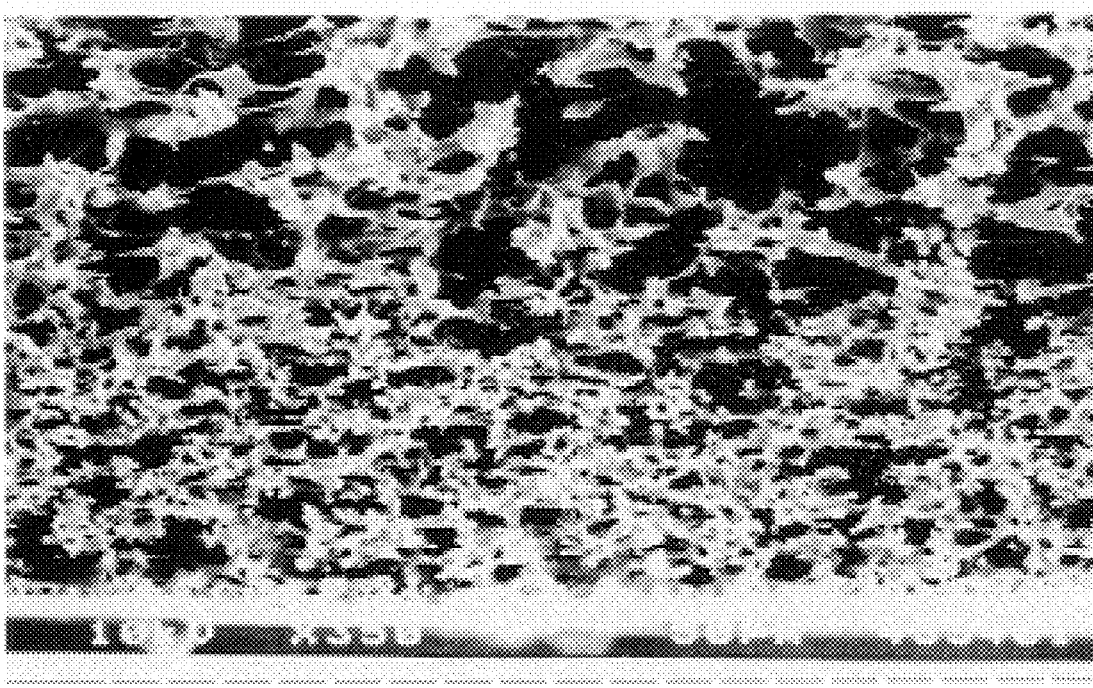
FIG. 3 is a scanning electron micrograph (SEM) of a membrane in accordance with the invention providing a cross-sectional view of the membrane.
Figure 4:
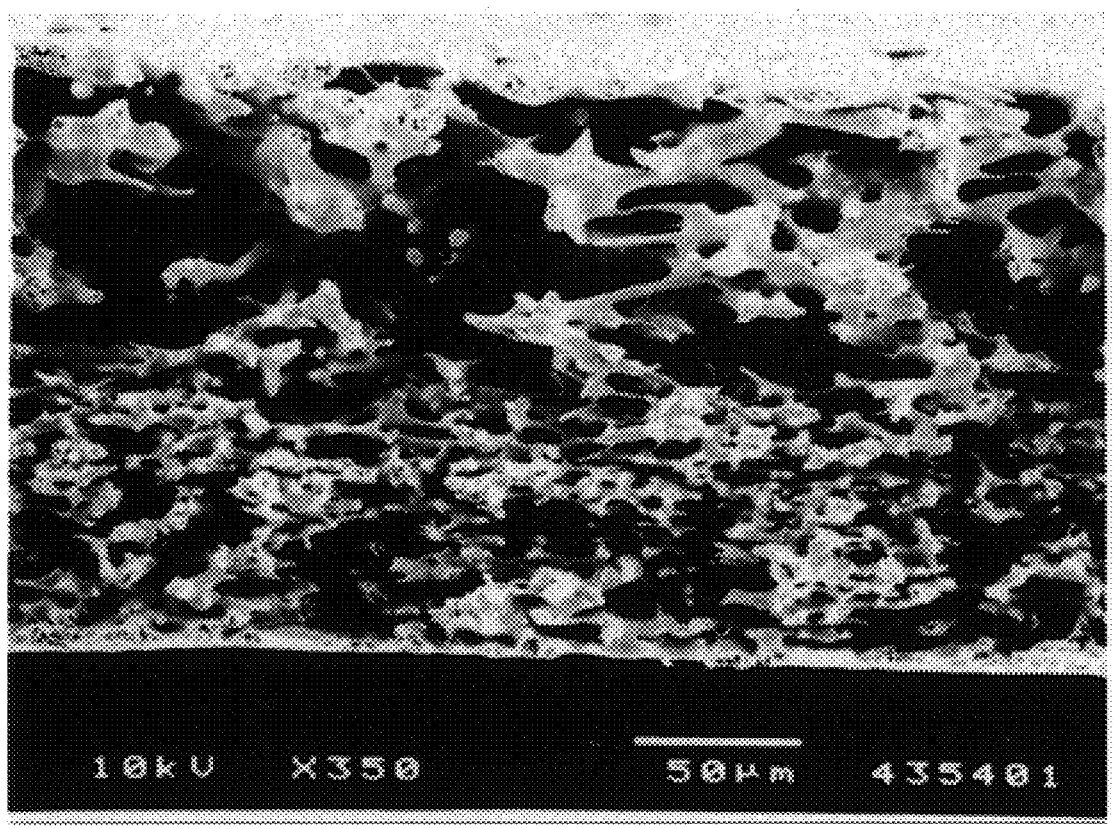
FIG. 4 is a scanning electron micrograph (SEM) of a membrane in accordance with the invention providing a cross-sectional view of the membrane.

| Film No. | Water Permeabilities[1] | Structure |
| --- | --- | --- |
| 2a | 3750 ml/min | FIG. 2 |
| 2b | 5712 ml/min | FIG. 3 |
| 2c | 6000 ml/min | FIG. 4 |

[1]Water permeabilities were measured at 10-psid on a 47-mm diameter disc (9.5 cm$^2$).

FIG. 2 is a scanning electron micrograph (SEM) of Film No. 2a providing a cross-sectional view of the membrane. FIG. 3 is a scanning electron micrograph (SEM) of Film No. 2b providing a cross-sectional view of the membrane. FIG. 4 is a scanning electron micrograph (SEM) of Film No. 2c providing a cross-sectional view of the membrane. In the Figures, it will be observed that the membranes increase in asymmetry as the temperature of the quenching bath is increased. In addition, the pore size in the microporous skins of the membranes appear to increase as the temperature of the quenching bath is increased.

EXAMPLE 3

Casting Solution Containing Nonsolvent; Effects of Exposure Time, Air Circulation, and Quench Temperature In this example, we prepared and cast membranes prepared from a dispersion of polysulfone and polyvinylpyrrolidone in dimethyl formamide as the solvent and water as the nonsolvent. We prepared four separate membranes from the solution, with each membrane prepared with a different air exposure time, with or without circulation of air, and quench bath temperature, as follows:

A casting dispersion was prepared from 10.6% polysulfone polymer (Udel 3500, manufactured by AMOCO Co.), 15% of polyvinylpyrrolidone (PVP, MW 40,000), 73.9% dimethyl formamide, and 0.5% water. The casting solution was maintained at room temperature (approximately 20° C.) and four separate membranes were cast. Casting was accomplished using a casting knife that had a gap of 24-mils, onto a moving belt of polyethylene coated paper. The casting conditions used in connection with the casting are shown in the following Table:

TABLE VII

| Film No. | Air Exposure Time (sec) | Quench Bath Temperature (° C.) | Air Circulation |
| --- | --- | --- | --- |
| 3a | 20 | 55° C. | Yes |
| 3b | 32 | 51° C. | No |
| 3c | 14 | 48° C. | Yes |
| 3d | 16 | 45° C. | Yes |

The relative humidity of the air used in each run was 80%. Air circulation was accomplished with a fan. Following quenching and coagulation of the membranes, the membranes were washed with deionized water and air dried. The characteristics of the resulting membranes are shown in the following Table:

TABLE VIII

| Film No. | Coulter Mean Flow Pore Size ($\mu$m) | Water Permeablilities[1] | Structure |
| --- | --- | --- | --- |
| 3a | 4.32 | 4,000 ml/min | FIG. 5 |
| 3b | 0.42 | 500 ml/min | N/A |
| 3c | 2.6 | 4,800 ml/min | FIG. 6 |
| 3d | 3 | 4,800 ml/min | N/A |

[1]Water permeabilities were measured at 10-psid on a 47-mm diameter disc (9.5 cm$^2$).

FIG. 5 presents a pair of scanning electron micrographs (SEM's) of Film No. 3a. FIG. 5a is a top view of Film No. 3a, showing the microporous surface of the membrane. FIG. 5b is a cross-sectional view of Film No. 3a. In the Figures, it will be observed that the membrane shows good asymmetry, however, relatively low surface porosity. FIG. 6 presents a pair of scanning electron micrographs (SEM's) of Film No. 3c. FIG. 6a is a top view of Film No. 3c, showing the microporous surface of the membrane. FIG. 6b is a cross-sectional view of Film No. 3c. In the Figures, it will be observed that he membrane shows good asymmetry and enhanced surface porosity relative to Film No. 3a.

The permeability for all of the membranes, other than Film No. 3b, are quite good. In addition, the Coulter data on all of the membranes, other than Film No. 3b, are in a good range. It appears as though whether the humid air is circulated or not, the exposure time to the humid air, and the temperature of the quench bath, each combine to profoundly effect the pore size. The long exposure time in Film 3b, without circulation, and the relatively enhanced quench temperature, presumably combined to form a very "tight" microporous skin. With respect to Film Nos. 3a, 3c, and 3d, the circulation of the humid air appeared to assist in opening the pores. The quench temperature and exposure time appeared to open the pores in 3a more than 3c or 3d. Further, exposure times and quench temperature appear to be capable of independent variation to obtain similar porosities as is observed by the results in respect of Film Nos. 3c and 3d.

In addition, it is intriguing to note that it is not pore size alone that is determinative of the water permeability. Film No. 3a, while possessing larger pores than Film Nos. 3c and 3d, had reduced permeability. This appears to be due to a reduced skin pore distribution as seen in FIG. 5a when compared to FIG. 6a.

EXAMPLE 4

Effect of PVP Molecular Weight

In this example, we prepared and cast a membrane prepared from a dispersion of polysulfone and polyvinylpyrrolidone in dimethyl formamide as the solvent and water as the nonsolvent. The casting solution was prepared from 10.6% polysulfone polymer (Udel 3500, manufactured by AMOCO Co.), 10% of polyvinylpyrrolidone (PVP, MW 360,000), 79.4% dimethyl formamide, and 0.5% water. The casting solution was maintained at room temperature (approximately 20° C.) and casting was accomplished using a casting knife that had a gap of 18-mils, onto a moving belt of polyethylene coated paper. The cast solution was exposed to circulating humid air (70% relative humidity) for 20 seconds. The membrane was quenched in water. Following quenching and coagulation of the membrane, the membrane was washed with deionized water and air dried. The characteristics of the resulting membrane is shown in the following Table:

TABLE IX

| Film No. | Water Permeabilities[1] | Structure |
|---|---|---|
| 4a | 4,000 ml/min | FIG. 7 |

[1]Water permeabilities were measured at 10-psid on a 47-mm diameter disc (9.5 cm²).

FIG. 7 presents a pair of scanning electron micrographs (SEM's) of Film No. 4a. FIG. 7a is a top view of Film No. 4a, showing the microporous surface of the membrane. FIG. 7b is a cross-sectional view of Film No. 4a. In the Figures, it will be observed that the membrane shows good asymmetry and a high surface porosity. The surface porosity appears enhanced relative to Film No. 3a (FIG. 5a) but slightly reduced relative to Film No. 3c (FIG. 6a). Interestingly, the surface pore structure or distribution in Film No. 4a appears almost as a median between the few surface pores seen in Film No. 3a (FIG. 5a) and the multitude seen in Film No. 3c (FIG. 6a).

EXAMPLE 5

Effect of PVP Molecular Weight

In this example, we prepared and cast a membrane prepared from a homogeneous solution of polysulfone and polyvinylpyrrolidone in dimethyl formamide as the solvent. The casting solution was prepared from 11% polysulfone polymer (Udel 3500, manufactured by AMOCO Co.), 5% of polyvinylpyrrolidone (PVP, MW 10,000), 13% t-amyl alcohol, and 71% dimethyl formamide. The casting solution was heated to 40° C. and casting was accomplished using a casting knife that had a gap of 20-mils, onto a moving belt of polyethylene coated paper. The cast solution was exposed to circulating humid air (50% relative humidity) for 7 seconds. The membrane was quenched in water at 43° C. Following quenching and coagulation of the membrane, the membrane was washed with deionized water and air dried. The characteristics of the resulting membrane is shown in the following Table:

TABLE #

| Film No. | Water Permeabilities[1] | Structure |
|---|---|---|
| 5a | 1552 ml/min | N/A |

[1]Water permeabilities were measured at 10-psid on a 47-mm diameter disc (9.5 cm²).

It appears as though the low relative humidity may have played a role in the poor permeabilities achieved by Film No. 5a.

EXAMPLES RELATING TO LATERAL WICKING APPLICATIONS

The following examples relate to use of the membranes of the present invention in lateral wicking applications for use as testing devices. Such examples are meant to be illustrative of the various testing applications in which the membranes of the invention can be used and to provide guidance as to the efficiency of the membranes of the present invention in such applications. As such, the following examples are illustrative and not limiting.

EXAMPLE 6

We prepared certain samples of membranes in accordance with copending U.S. patent application, Ser. No. 08/206,114, filed Mar. 4, 1994, the disclosure of which is hereby incorporated by reference (designated herein BTS-11 and BTS-X membranes), for comparison of wicking properties with membranes produced in accordance with the present invention. The BTS-11 and BTS-X membranes were prepared as follows:

TABLE X

| Membrane | Formulation | Casting Conditions |
|---|---|---|
| BTS-11 | 10.72% Polysulfone<br>15.56% t-amyl alcohol<br>73.72% Dimethyl Formamide | Air Exposure: 3.8 sec. |
| BTS-X | 10.72% Polysulfone<br>15.56% t-amyl alcohol<br>73.72% Dimethyl Formamide | Air Exposure: 5.0 sec. |

The BTS-11 membranes possessed average microporous skin pore sizes of approximately 0.8 μm and the BTS-X membranes possessed average microporous skin pore sizes of approximately 3.2 μm, as measured by Coulter.

EXAMPLE 7

The BTS membranes prepared in Example 6 were compared with membranes prepared in accordance with the invention for lateral wicking rates. We looked at the rate of wicking of water, a blue ink solution, and whole mammalian blood. Deionized water was used for the water test, the blue ink solution was a 2% solution of methylene blue, and whole sheep's blood was used for the blood sample. We also looked at the rate of transfer of separated plasma (from the blood) after it had wicked laterally through the membrane and had contacted the contact membrane (for example, see FIG. 9), which was a nitrocellulose membrane. The results from these tests are shown in the following Tables:

TABLE XI

| Membrane | Water Wicking (sec/3 cm strip) | Blue Ink Wicking (sec/3 cm strip) | Mean Flow Pore Size ($\mu$m) |
|---|---|---|---|
| BTS-X | 32 sec. | 40 sec. | 3.2 $\mu$m |
| 3c | 5.5 sec. | 6 sec. | 2.6 $\mu$m |

TABLE XII

| Membrane | Blue Ink Wicking (sec/3 cm strip) | Sheep Blood Wicking (sec/2 cm strip) | Plasma Transfer to $NO_2$-Cellulose (1 cm) |
|---|---|---|---|
| 2b | 9 sec. | Good Blood/Plasma Separation Slow Wicking | Not Measured |
| 2c | 5.4 sec. | Moderate Blood/ Plasma Separation Slow Wicking | Not Measured |
| BTS-11 | 42 sec. | Not Measured | Not Measured |
| BTS-X | 40 sec. | 120 sec. | 250 sec. |
| 3c | 6 sec. | 35 sec. | 90 sec. |

Preferred membranes of the invention for blood separation applications exhibit lateral wicking of water at a rate faster than 2 mm/sec. and preferably faster than 3 or 4 mm/sec. In addition, such membranes preferably exhibit lateral wicking for mammalian blood at a rate faster than 0.3 mm/sec. and preferably faster than 0.4 or 0.5 mm/sec. As will be observed from Tables XI and XII, membrane 3c exhibits exceptional speed in both water lateral wicking rate and blood plasma wicking rate. The water wicking rate is approximately 5.45 mm/sec. and the blood plasma wicking rate is approximately 0.57 mm/sec.

In addition, the plasma transfer rate to nitrocellulose for membrane 3c is substantially better than that observed for the BTS-X membrane. Without wishing to be bound to any particular theory or mode of operation, it is believed that the plasma transfer rate to nitrocellulose is related to the degree of porosity of the microporous skin of the membrane. As seen in FIG. 6a, which is an SEM of the microporous skin surface of membrane 3c, the skin possesses a very high degree of porosity. The microporous skin pore sizes of the BTS-X membranes, while large (3.2 $\mu$m), are not as numerous (i.e., there is a lower pore density).

Pore density can be easily computed for a given membrane sample through obtaining a scanning electron micrograph of the surface of the membrane of interest of a given square surface area and computing the number of pores contained in the given area. The number of pores computed to be in a given square area can be normalized to a particular reference square area through a simple ratio. For instance, below, the pore density figures for particular membranes is given in number of pores per 1000 $\mu$m$^2$. For comparison purposes, in a BTS-X membrane, there are, on average, approximately 8.81 pores/1000 $\mu$m$^2$. In contrast, membranes prepared in accordance with the present invention possess greater pore density. The membrane shown in FIG. 7a, for example, has approximately 12.79 pores/1000 $\mu$m$^2$. In addition, the membrane shown in FIG. 6a has approximately 18.41 pores/1000 $\mu$m$^2$. Thus, preferred membranes prepared in accordance with the present invention can be characterized as possessing a pore density greater than 9 pores/1000 $\mu$m$^2$. In more preferred embodiments, the pore density is greater than 10 pores/1000 $\mu$m$^2$, and even more preferably, greater than 11 or 12 pores/1000 $\mu$m$^2$.

EQUIVALENTS

The present invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What we claim is:

1. An integral sulfone polymer membrane, rendered hydrophilic through co-casting the sulfone polymer with a hydrophilic polymer, the membrane comprising a microporous skin and a porous support, the microporous skin possessing a high pore density and the porous support comprising an isotropic region adjacent the skin, the isotropic region having substantially constant pore sizes, the porous support further comprising an asymmetric region adjacent the isotropic region and having gradually increasing pore sizes from the pores of the isotropic region.

2. The membrane of claim 1, wherein the membrane comprises a mean flow pore size of from about 1 $\mu$m to about 5 $\mu$m.

3. The membrane of claim 1, wherein the sulfone polymer is selected from the group consisting of polysulfone, polyethersulfone, and polyarylsulfone.

4. The membrane of claim 1, wherein the hydrophilic polymer comprises polyvinylpyrrolidone.

5. The membrane of claim 3, wherein the hydrophilic polymer comprises polyvinyl pyrrolidone.

6. The membrane of claim 1, wherein the membrane possesses a lateral wicking speed of water of at least 3 mm/second.

7. The membrane of claim 1, wherein the membrane has a thickness and isotropic region extends from the microporous skin through about 15–25% of the thickness.

8. An integral sulfone polymer membrane, rendered hydrophilic through co-casting the sulfone polymer with a hydrophilic polymer, the membrane comprising a microporous skin and a porous support, the microporous skin possessing a high pore density and the porous support comprising an isotropic region adjacent the skin, the isotropic region defining flow channels of substantially constant diameter, the porous support further comprising an asymmetric region adjacent the isotropic region and defining flow channels of gradually increasing diameters from the flow channels of the isotropic region.

9. The membrane of claim 8, wherein the membrane comprises a mean flow pore size of from about 1 $\mu$m to about 5 $\mu$m.

10. The membrane of claim 8, wherein the sulfone polymer is selected from the group consisting of polysulfone, polyethersulfone, and polyarylsulfone.

11. The membrane of claim 8, wherein the hydrophilic polymer comprises polyvinylpyrrolidone.

12. The membrane of claim 10, wherein the hydrophilic polymer comprises polyvinylpyrrolidone.

13. The membrane of claim 8, wherein the membrane possesses a lateral wicking speed of water of at least 3 mm/second.

14. The membrane of claim 8, wherein the membrane has a thickness and isotropic region extends from the microporous skin through about 15–25% of the thickness.

15. A method to prepare a hydrophilic integral sulfone polymer membrane, comprising:

provid ing a casting dope comprising between about 8% and 14% by weight of a sulfone polymer and between about 5% and 25% by weight of a hydrophilic polymer, dissolved in a solvent;

casting the dope to form a thin film;

exposing the thin film to a gaseous environment, including water vapor at a relative humidity of between about 50% and 80% for between about 5 seconds and 35 seconds;

coagulating the film in a water bath having a temperature between about 30° C. and 70° C.; and recovering a membrane, comprising a microporous skin and a porous support, the microporous skin possessing a high pore density and the porous support comprising an isotropic region adjacent the skin, the isotropic region having substantially constant pore sizes, the porous support further comprising an asymmetric region adjacent the isotropic region and having gradually increasing pore sizes from the pores of the isotropic region.

16. The method of claim 15, wherein the dope is a homogeneous solution.

17. The method of claim 15, wherein the dope additionally comprises a nonsolvent for the sulfone polymer.

18. The method of claim 15, wherein the dope is a dispersion.

19. The method of claim 15, wherein the membrane comprises a mean flow pore size of from about 1 $\mu$m to about 5 $\mu$m.

20. The method of claim 15, wherein the sulfone polymer is selected from the group consisting of polysulfone, polyethersulfone, and polyarylsulfone.

21. The method of claim 20, wherein the hydrophilic polymer comprises polyvinylpyrrolidone.

22. The method of claim 15, wherein the hydrophilic polymer comprises polyvinylpyrrolidone.

23. The method of claim 15, wherein the membrane possesses a lateral wicking speed of water of at least 2 mm/second.

24. The method of claim 15, wherein the membrane has a thickness and isotropic region extends from the microporous skin through about 15–25% of the thickness.

25. An improved diagnostic device of the type comprising a separation membrane and a contact membrane, the improvement comprising:

the separation membrane comprising an integral sulfone polymer membrane, rendered hydrophilic through co-casting the sulfone polymer with a hydrophilic polymer, the membrane comprising a microporous skin and a porous support, the microporous skin possessing a high pore density and the porous support comprising an isotropic region adjacent the skin, the isotropic region having substantially constant pore sizes, the porous support further comprising an asymmetric region adjacent the isotropic region and having gradually increasing pore sizes from the pores of the isotropic region.

26. The device of claim 25, wherein the membrane comprises a mean flow pore size of from about 1 $\mu$m to about 5 $\mu$m.

27. The device of claim 25, wherein the sulfone polymer is selected from the group consisting of polysulfone, polyethersulfone, and polyarylsulfone.

28. The device of claim 25, wherein the hydrophilic polymer comprises polyvinylpyrrolidone.

29. The device of claim 27, wherein the hydrophilic polymer comprises polyvinylpyrrolidone.

30. The device of claim 25, wherein the membrane possesses a lateral wicking speed of water of at least 3 mm/second.

31. The device of claim 25, wherein the device is a lateral wicking device.

* * * * *